United States Patent
Schon et al.

(10) Patent No.: US 10,416,847 B2
(45) Date of Patent: Sep. 17, 2019

(54) ASYNCHRONOUS DROPDOWN LIST DATA LOADING

(71) Applicant: SAP SE, Walldorf (DE)

(72) Inventors: Jamila Schon, Heidelberg (DE); Arley Triana Morin, Walldorf (DE)

(73) Assignee: SAP SE, Walldorf (DE)

( * ) Notice: Subject to any disclaimer, the term of this patent is extended or adjusted under 35 U.S.C. 154(b) by 335 days.

(21) Appl. No.: 15/373,957

(22) Filed: Dec. 9, 2016

(65) Prior Publication Data

US 2018/0164957 A1   Jun. 14, 2018

(51) Int. Cl.
| | | |
|---|---|---|
| G06F 3/0482 | (2013.01) | |
| G06F 3/14 | (2006.01) | |
| G06F 3/023 | (2006.01) | |
| G06F 3/0484 | (2013.01) | |
| G06F 3/0489 | (2013.01) | |

(52) U.S. Cl.
CPC .......... *G06F 3/0482* (2013.01); *G06F 3/0236* (2013.01); *G06F 3/0237* (2013.01); *G06F 3/14* (2013.01); *G06F 3/0489* (2013.01); *G06F 3/04842* (2013.01)

(58) Field of Classification Search
CPC ........ G06F 3/842; G06F 3/314; G06F 3/0237; G06F 3/0236; G06F 3/0489; G06F 3/0482; G06F 3/14; G06F 3/04842
See application file for complete search history.

(56) References Cited

U.S. PATENT DOCUMENTS

| | | | | |
|---|---|---|---|---|
| 6,559,873 | B1* | 5/2003 | Dawkins | G06F 3/04812 715/856 |
| 7,472,357 | B1* | 12/2008 | Satterfield | G06F 3/048 709/206 |
| 7,971,155 | B1* | 6/2011 | Yoon | G06F 3/0482 715/843 |
| 9,081,580 | B2* | 7/2015 | Gaffney | G06F 8/38 |

(Continued)

OTHER PUBLICATIONS

Telerik Forums, "How to manually show and hide loading or spinning image? in Kendo UI for jQuery Grid", Jan. 17, 2012-Sep. 8, 2015, https://www.telerik.com/forums/how-to-manually-show-and-hide-loading-or-spinning-image (Year: 2015).*

(Continued)

*Primary Examiner* — Andrew L Tank
(74) *Attorney, Agent, or Firm* — Schwegman Lundberg & Woessner, P.A.

(57) ABSTRACT

Example embodiments of a system and method for asynchronous data item loading for a dropdown list of a user interface are described. In an example embodiment, a user input directed to a dropdown list control to cause presentation of at least one of the data items of the dropdown list is received. In response to the user input, a determination is made as to whether the data items are available for presentation. If not, the user input is queued in an event queue, the data items are requested from another computing system via a communication network, and a busy indicator is presented on the user interface in conjunction with the dropdown list control to indicate that the data items are not available for presentation. In response to receiving the data items, the busy indicator is removed, and the user input queued in the event queue is processed.

19 Claims, 10 Drawing Sheets

(56) References Cited

U.S. PATENT DOCUMENTS

| | | | |
|---|---|---|---|
| 9,378,276 B1* | 6/2016 | Mengle | G06F 17/30864 |
| 9,529,936 B1* | 12/2016 | Pankaj | G06F 17/3064 |
| 2001/0019338 A1* | 9/2001 | Roth | G06F 3/0482 |
| | | | 715/811 |
| 2002/0109718 A1* | 8/2002 | Mansour | G06F 9/452 |
| | | | 715/744 |
| 2003/0223734 A1* | 12/2003 | Cooper, Jr. | H04N 5/44543 |
| | | | 386/244 |
| 2005/0071773 A1* | 3/2005 | Ivanovic | G06F 3/04817 |
| | | | 715/768 |
| 2006/0069989 A1* | 3/2006 | Jones | G06F 17/24 |
| | | | 715/273 |
| 2006/0195454 A1* | 8/2006 | Davis | G06F 17/30908 |
| 2009/0070685 A1* | 3/2009 | Pamu | G06F 17/30398 |
| | | | 715/745 |
| 2009/0077486 A1* | 3/2009 | Haynes | G06F 3/0482 |
| | | | 715/780 |
| 2009/0259934 A1* | 10/2009 | Prisament | G06F 17/30893 |
| | | | 715/234 |
| 2010/0037150 A1* | 2/2010 | Sawant | G06F 17/30896 |
| | | | 715/753 |
| 2010/0064224 A1* | 3/2010 | Beermann | H04N 5/44513 |
| | | | 715/733 |
| 2010/0162175 A1* | 6/2010 | Lee | G06F 3/0482 |
| | | | 715/860 |
| 2012/0150886 A1* | 6/2012 | Kwiatkowski | G06F 17/30902 |
| | | | 707/758 |
| 2014/0075280 A1* | 3/2014 | Laakmann | G06F 17/243 |
| | | | 715/225 |
| 2014/0281909 A1* | 9/2014 | Pinto | G06F 9/45529 |
| | | | 715/234 |
| 2015/0193818 A1* | 7/2015 | Turner | G06Q 30/0251 |
| | | | 705/14.49 |
| 2015/0277681 A1* | 10/2015 | Isaacson | G06F 3/0484 |
| | | | 705/26.8 |
| 2016/0028848 A1* | 1/2016 | Gehring | H04L 67/2842 |
| | | | 709/213 |
| 2016/0041701 A1* | 2/2016 | Gao | G06F 3/04847 |
| | | | 715/825 |
| 2016/0202960 A1* | 7/2016 | Minh Le | G06F 11/3624 |
| | | | 717/158 |

OTHER PUBLICATIONS

Brown; Greg, "Displaying an Activity Indicator while Loading Table View Data", Dec. 22, 2015, https://dzone.com/articles/displaying-an-activity-indicator-while-loading-tab (Year: 2015).*

Algiecas, Answer—Stack Overflow, "Show "Loading . . . " in dropdown box", Jul. 13, 2009, https://stackoverflow.com/questions/1120920/show-loading-in-dropdown-box (Year: 2009).*

Ward, "Easy incremental status updates for long requests", Oct. 15, 2008, Archive.org https://web.archive.org/web/20140117195423/http://encosia.com/easy-incremental-status-updates-for-long-requests/ Jan. 17, 2014 (Year: 2014).*

* cited by examiner

ASYNCHRONOUS DROPDOWN LIST DATA LOADING

FIELD

The present application relates generally to data processing and, more specifically in an example embodiment, to asynchronous data item loading for a dropdown list of a user interface.

BACKGROUND

Many graphical user interfaces (GUIs) employ one or more dropdown lists, by which a list of predetermined options for a particular type of input (e.g., a selection of a particular state in the United States) are presented for selection by the user, such as by way of a mouse-click on a predetermined control area in the GUI associated with the dropdown list. In at least some cloud-based applications, the data identifying the items in the dropdown list are loaded prior to the dropdown list control, such as a box with a downward-facing arrow, being displayed on the GUI. Accessing the data identifying the list in such a manner thus ensures that a user selection may be received and processed synchronously (e.g., as soon as the dropdown list control is available on the GUI). As the data in these examples is retrieved from the cloud (e.g., from a server accessible via a wide area network (WAN), such as the Internet), a delay between the time a GUI is to be presented and the time the GUI is actually presented to the user may be incurred to allow downloading of the data identifying the list items. In addition, this delay may be exacerbated when the number of elements in the list is high and/or when multiple such dropdown list controls are to be displayed in the GUI.

BRIEF DESCRIPTION OF DRAWINGS

The present disclosure is illustrated by way of example and not limitation in the figures of the accompanying drawings, in which like reference numbers indicate similar elements.

DETAILED DESCRIPTION

In the following description, for purposes of explanation, numerous specific details are set forth to provide an understanding of various example embodiments of the present subject matter. It will be evident, however, to those skilled in the art, that example embodiments of the present subject matter may be practiced without these specific details.

Figure 1:
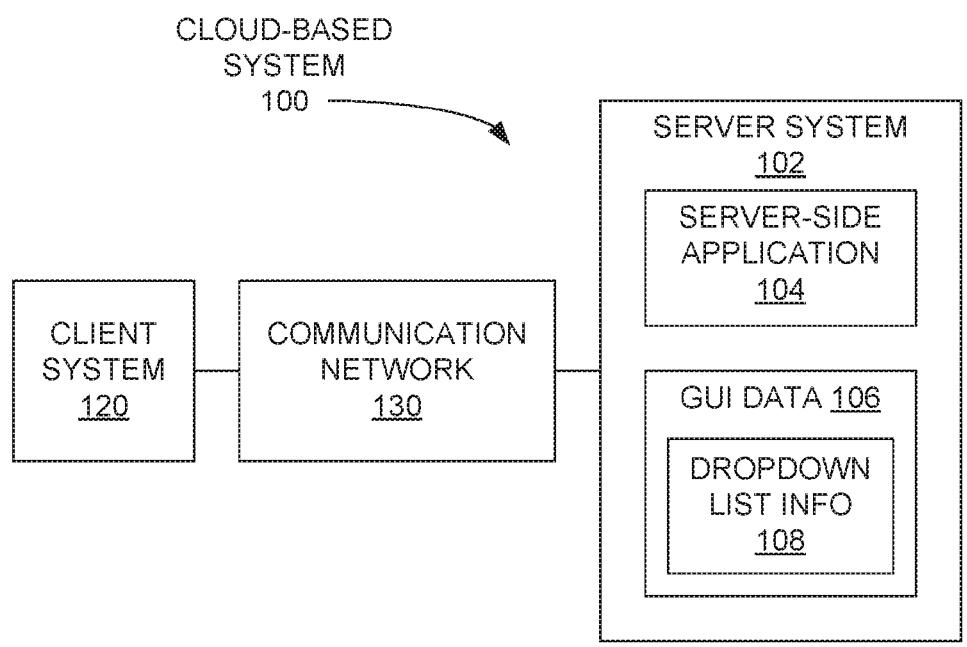
FIG. 1 is a block diagram of an example cloud-based system.

FIG. 1 is a block diagram of an example cloud-based system 100 in which a client system 120 accesses a server system 102 by way of a communication network 130, such as a wide area network (WAN) (e.g., the Internet), a wireless WAN (WWAN), a local area network (LAN), a wireless LAN (WLAN), a cellular data network (e.g., a third-generation (3G) or fourth-generation (4G) network), another communication connection, and/or combinations thereof. The client system 120, the server system 102, or both may be responsible for executing at least some portion of an application 104 in which a user interface (e.g., a graphical user interface (GUI)) is presented to a user of the client system 120 to facilitate entry of user input to interact with the application. In one example, the server system 102 executes the application 104 as a server-side application 104, while the client system 120 provides the user of the client system 120 an interface by which to interact with the server-side application 104, such as by way of a web browser application, a dedicated client application facilitating communication via an application programming interface (API) with the application executing on the server system 102, or other means.

In each of these example embodiments, the server system 102 may store or access GUI data 106 to facilitate use of the application 104 via the user interface presented by the client system 120 to the user. For example, the server system 102 may hold information 108 identifying a plurality of data items that are to be presented to the user by way of a dropdown list or menu of the user interface, An example of such a dropdown list is a "combo box," which is a GUI widget or object provided in the Java® programming language and others in which a selectable dropdown list may be searched by way of an editable text input field. Example embodiments discussed hereinafter are directed to such a dropdown list, although other types of dropdown lists or other user interface objects by which multiple selectable items are presented to a user may benefit from application of the principles discussed herein.

As discussed more fully below, example embodiments of the client system 120 of the cloud-based system 100, when presenting a user interface incorporating a dropdown list to a user, may not immediately retrieve the data items to be presented in the dropdown list upon presentation of the user interface to the user. Instead, the client system 120 may wait until the user has directed one or more input actions to a control area of the dropdown list that causes presentation of one or more of the data items of the dropdown list. This asynchronous functionality of the client system 120, by which the loading of the data items and the requested processing of those items may be performed asynchronously from the reception of the user input, may result in enhanced performance of the client system 120 and the application for which the user interface is presented. For example, user access to the dropdown list may be optional or otherwise unnecessary, so downloading of the data items in response to presenting the user interface may result in an unwanted delay at the client system 120, especially if several dropdown lists are incorporated in the user interface, or if one or more such lists include numerous (e.g., several hundred) data items. Thus, unnecessary delays in execution of the application may be avoided, and intersystem communication between the client system 120 and the server system 102 may be minimized.

Figure 2:
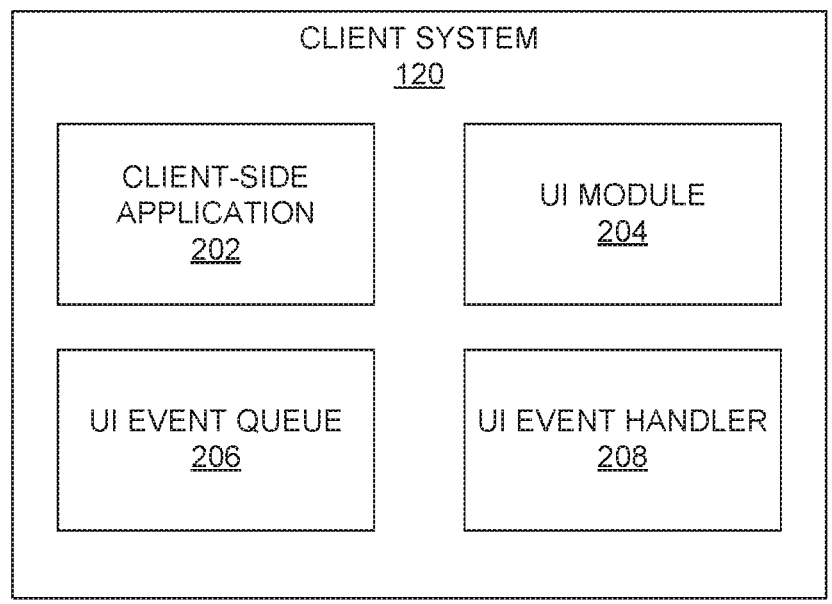
FIG. 2 is a block diagram of an example client system of the example cloud-based system of FIG. 1.

FIG. 2 is a block diagram of an example embodiment of the client system 120 of the cloud-based system 100 of FIG. 1. Shown within the client system 120 are several components or modules, including a client-side application 202, a user interface (UI) module 204, a user interface event queue 206, and a user interface event handler 208. Other components or modules not explicitly discussed herein may be included in the client system 120 in other embodiments. In other example embodiments, one or more of the modules 202-208 may be omitted, be combined with other modules 202-208. In an example embodiment, one or more of the modules 202-208 may be hardware circuitry, one or more hardware processors (e.g., a central processing unit (CPU), a graphical processing using (GPU), and/or the like) executing instructions stored in a memory, or some combination thereof.

In an example embodiment, the client-side application 202 may be configured to provide user access to an application executing on the server system 102. As indicated above, in such embodiments, the client-side application 202 may be a web browser application communicating with the application 104 executing on the server system 102 (e.g., by way of HyperText Transfer Protocol (HTTP)), a dedicated application communicating with the application 104 executing on the server system 102 (e.g., by way of an API), and so on. In other example embodiments, the client-side application 202 may be an application executing on the client system 120 that accesses data used by the application 202 from the server system 102. Such data may include the data items to be presented in a dropdown menu of a user interface.

The user interface module 204 may be configured to present the user interface employed by the client-side application 202, to receive user input provided via the user interface, to present results of the client-side application 202, and the like. In some example embodiments, the user interface module 204 may also request data items from the server system 102 via the communication network 130 that are to be presented in a dropdown list, provide a busy indicator while the user interface module 204 awaits requested data items in response to a user input directed to the dropdown list, and so on.

The user interface event queue 206 may be employed by the user interface module 204 to queue user input that is received while information identifying data items for a dropdown list are being received from the server system 102, with the queued user input being processed subsequent to the arrival of the information from the server system 102. To that end, one or more user interface event handlers 208 may be configured to receive user interface events, such as user input entered via the user interface, and process those events. In some examples embodiments, the user interface event handler 208 may process user input events synchronously (e.g., at the time the user input is received), such as a user input for accessing the data items of the dropdown list, and/or may process such user input events asynchronously (e.g., at some time after the user input is received) if the data items of the dropdown list are not currently available.

In some example embodiments, one or more of the user interface module 204, the user interface event queue 206, and the one or more event handlers 208 may be incorporated within the client-side application 202. Other ways of organizing the modules 202-208 of the client system 120 are also possible in other embodiments.

Figure 3A:
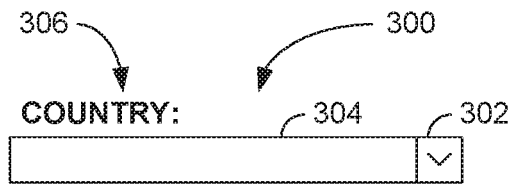
FIGS. 3A, 3B, 3C, 3D, 3E, and 3F are graphical representations of an example embodiment in which several user inputs are directed to a dropdown list control to display a dropdown list when the data items for the dropdown list are currently available.
Figure 3B:
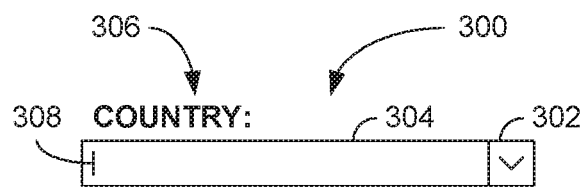
Figure 3C:
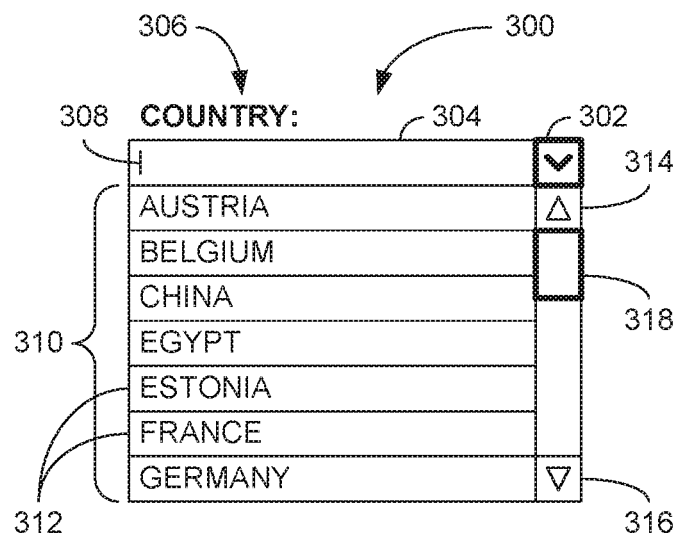
Figure 3D:
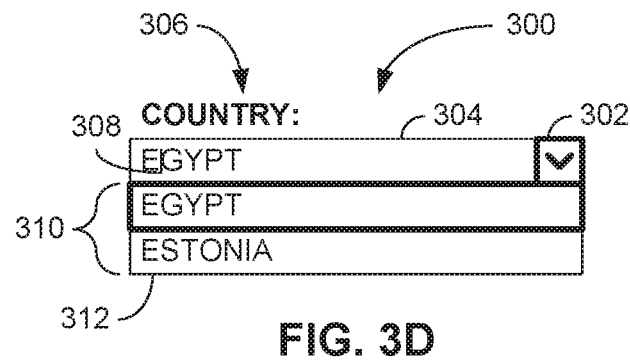
Figure 3E:
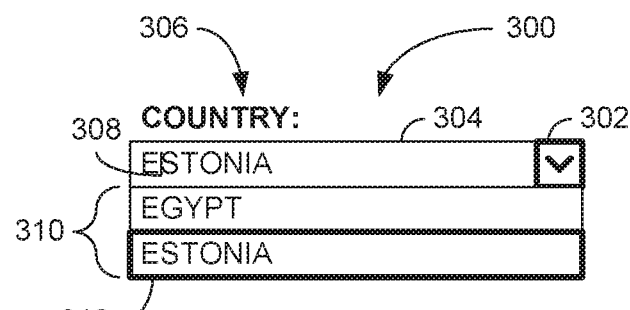
Figure 3F:
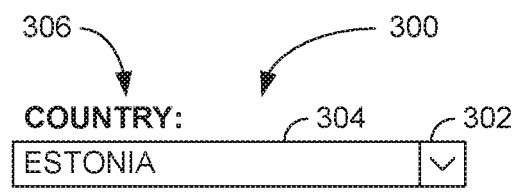

FIGS. 3A, 3B, 3C, 3D, 3E, and 3F are graphical representations of an example embodiment in which several user inputs are directed in series to a dropdown list control 300 to display a dropdown list 310 when the data items 312 for the dropdown list 310 are currently available. In this example embodiment and others described below, the dropdown list control 300 may include a dropdown list button 302 that, when activated (e.g., clicked using a cursor) by a user, causes one or more of the data items 312 of the dropdown list 310 to be displayed. The dropdown list control 300 may also include, in an example embodiment, a text input field 304 into which a user may input text characters to filter the data items 312 displayed in the dropdown list 310, thus facilitating a search for one or more particular data items 312. Also in some example embodiments in which the number of data items 312 to be displayed is too large for an area of the user interface allocated for the dropdown list 310, a slider 318 and associated scrolling buttons 314, 316 to navigate the dropdown list 310 may be provided. Other keys, such as the up-arrow key, the down-arrow key, the 'Home' key, the 'End' key, and so forth, may also be employed to navigate up and down the dropdown list 310. In an example embodiment, a label 306 (e.g., "Country:") may identify the type of data represented by each of the data items 312 of the dropdown list 310. In other example embodiments, the dropdown list 310 may be located at the top of the dropdown list control 300 instead of the bottom (as is shown in FIG. 3C, for example), or may be located in another area of the user interface relative to the text input field 304.

FIG. 3A provides a graphical representation of a dropdown list control 300 to which no user input has been directed. In this example embodiment, the dropdown list control 300 displays an unselected dropdown list button 302, an empty text input field 304, and a label 306. In some example embodiments, text or other characters may be displayed within the otherwise empty text input field 304 as a "placeholder" (e.g., "Select country"). FIG. 3B provides a version of the dropdown list control 300 after the user has selected (e.g., clicked using a mouse, touched using a finger or stylus on a touchscreen, etc.) the text input field 304. In response to that user input, the user interface module 204 may display a text input marker 308 within the text input field 304, thus facilitating the entry of text characters by the user into the text input field 304. In some example embodiments, during the entry of the text characters, or while the text input field 304 possesses "focus" (e.g., has been clicked or otherwise selected by the user), the text within the text input field 304 may be highlighted (e.g., via a background color, via bold and/or italicized characters, and so on). In the particular state of FIG. 3B, the user may also employ a particular user input to cause the dropdown list 310 to be displayed. In an example embodiment, in response to a user input of the alternate function key (e.g., the "Alt" key) in combination with the down direction function key (e.g., the down-arrow key, or another direction function key), one or more of the data items 312 are displayed in the dropdown list 310, as shown in FIG. 3C. In this particular example, the data items 312 are individual countries, and the number of data items 312 is greater than the number of data items 312 that may be displayed at a time in the user interface. In another example embodiment involving FIG. 3B, user selection of a down-arrow key (or other key) alone may cause one of the data items 312 of the dropdown list 310 (e.g., the first data item 312) to be displayed in the text input field 304 without displaying the dropdown list 310. In this state, the user may then use other keys (e.g., the up arrow and down arrow keys) to navigate from one data item 312 to another without displaying the dropdown list 310.

In another example embodiment, the user input received when the dropdown list control 300 is as shown in FIG. 3A may be a user selection (e.g., a click) of the dropdown button 302. In response to the user selection, the user interface module 204 may display the data items 312 in the dropdown list 310, as depicted in FIG. 3C, In these example embodiments, display of the dropdown list 310 is emphasized by a change in visual appearance of the dropdown button 302 (e.g., a bolder or brighter appearance of the lines or other features of the dropdown button 302). In an example embodiment, clicking the dropdown button 302 may also cause the text input marker 308 to be displayed to allow entry of text characters to filter the dropdown list 310, with the entered characters possibly being highlighted, as indicated above.

While the dropdown list control 300 is in the state shown in FIG. 3C, the user may begin inputting text characters into the text input field 304. In the particular example shown in FIG. 3D, the user may input the letter 'E' in the text input field 304 of the dropdown list control 300, resulting in only those data items 312 starting with the letter 'E' (e.g., 'Egypt' and 'Estonia') being displayed in the dropdown list 310. In addition, the first of the displayed data items 312 ('Egypt') that match the input text is highlighted to indicate that a particular subsequent user input (e.g., the 'Enter' key) may cause the highlighted data item 312 to be selected. Carrying the example further in FIG. 3E, the user may then provide user input via the dropdown list control 300 in the form of a down direction function key to highlight the next data item 312 ('Estonia') in the dropdown list 310. In other example embodiments, the user may type different or additional letters to filter the data items 312 of the dropdown list 310 in a different manner. In addition, the user may navigate between the displayed data items 312 of the dropdown list (e.g., via up and down arrow keys), and the currently highlighted data item 312 may be reflected in the text input field 304.

To actually enter the selected item (e.g., 'Estonia') as input to the application, the user may then employ the 'Enter' key, a mouse click, a tap, or some other predetermined user input. As shown in the dropdown list control 300 of FIG. 3F, the selected data item 312 ('Estonia') remains in the text input field 304 while the dropdown list 310 is removed from the user interface. In addition, the highlighting or other emphasis of the dropdown button 302 has been removed. In other example embodiments, if the user alters the current focus or selection from the text input field 304, the currently selected item may be provided as input to the application.

In the example embodiments of FIGS. 3A through 3F, the user interface module 302, possibly by way of the user interface event handler 208, determines that the data items 312 of the dropdown list 310 are currently available in the client system 120, and thus processes the user input events synchronously. For example, the dropdown list 310 may have been previously presented to the user via the user interface in response to a previous interaction of the user with the dropdown list control 300.

Figure 4A:
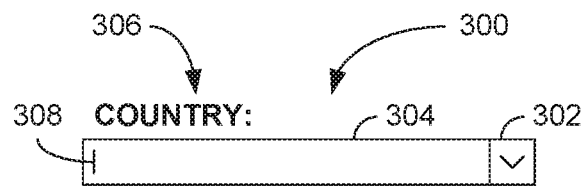
FIGS. 4A, 4B, and 4C are graphical representations of an example embodiment in which several user inputs are directed to a dropdown button of a dropdown list control to display a dropdown list when the data items for the dropdown list are not currently available.
Figure 4B:
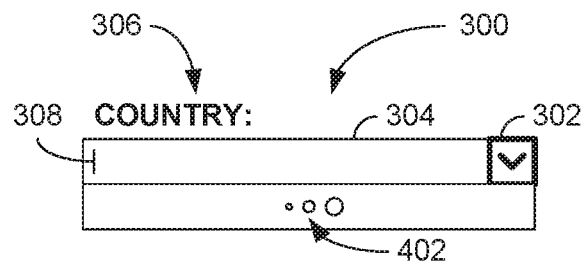
Figure 4C:
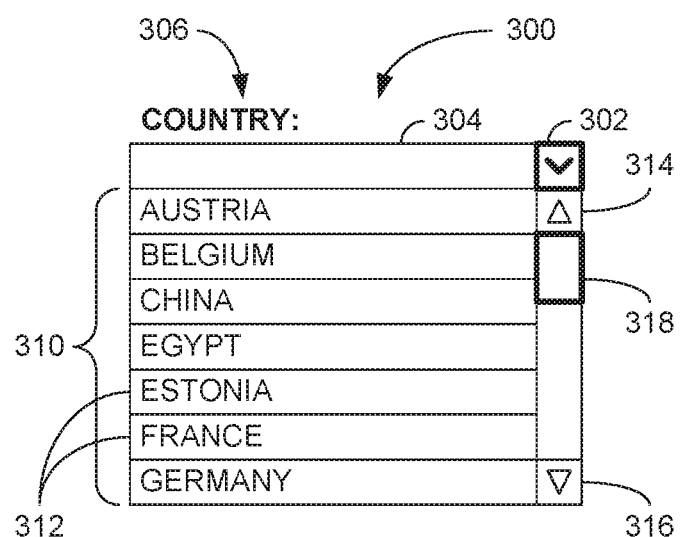

In contrast, FIGS. 4A, 4B, and 4C are graphical representations of an example embodiment in which several user inputs are directed to a dropdown button 302 of a dropdown list control 300 to display a dropdown list 310 when the data items 312 for the dropdown list 310 are not currently available. In the dropdown list control 300 of FIG. 4A, the user has clicked (e.g., by way of a cursor) the text input field 304, resulting in the text input marker 308 being displayed therein to facilitate the entry of text characters by the user into the text input field 304. In this particular state, the user may also employ a particular user input to cause the dropdown list 310 to be displayed. In an example embodiment, in response to a user input of the alternate function key (e.g., the "Alt" key) in combination with the down direction function key (e.g., the down-arrow key, or another direction function key), the user interface module 204 may determine that the one or more data items 312 are not available, as they have not been previously requested from the server system 102 via the communication network 130. In another embodiment, the user may directly activate (e.g., click) the dropdown button 302, again possibly resulting in a determination that the data items 312 of the dropdown list 310 are not available.

In response to this user input, the user interface module 204 may issue a request over the communication network 130 to the server system 102 for information regarding the data items 312, such as a character string for each data item 312, as well as possibly other information. In addition, the user interface module 204 may queue the user input in the user interface event queue 206 for subsequent processing after the information regarding the data items 312 has been received from the server system 102.

While awaiting that information, the user interface module 204 may cause the presentation of a busy indicator 402 in conjunction with the dropdown list control 300, as illustrated in FIG. 4B, thus indicating that the data items 312 are not ready for display. In addition, in some example embodiments, the user interface module 204 may apply one or more assistive technologies (e.g., a screen reader or other audio output) to announce the loading of the data items 312 to visually impaired users. In the particular example of FIG. 4B, the busy indicator 402 is located in an area normally associated with the dropdown list 310, but other locations in the user interface are also possible. In one example embodiment, the busy indicator 402 may be dynamic or animated in some manner (e.g., movement of images, change in size of images, and so on) to assure the user that the client system 120 has not stalled. In some example embodiments, the user interface module 204 may first determine whether the delay experienced by the user has exceeded some length of time (e.g., 300 milliseconds (msec)) before displaying the busy indicator 402. In at least some example embodiments, the busy indicator is intended to indicate to the user that the data items 312 are not yet available for presentation on the user interface, and/or that accessing of the data items 312 is currently in progress.

In response to receiving the information identifying the data items 312 from the server system 102 via the communication network 130, the user interface module 204 may then cause the previously queued user interface events to to be processed. To that end, one or more of the user interface event handlers 308 may retrieve the one or more events from the event queue (e.g., in the order in which they were queued) and process those events. In the example embodiment of FIG. 4C, the dropdown list control 300 may be modified in response to the previously received user input (e.g., the down-arrow key pressed concurrently with the 'Alt' key, or the activation of the dropdown button 302) to display the data items 312 of the dropdown list 310, as shown in FIG. 4C.

Figure 5A:
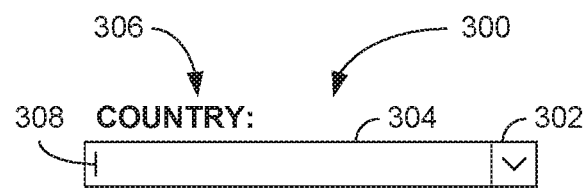
FIGS. 5A, 5B, and 5C are graphical representations of an example embodiment in which multiple user inputs are directed to a dropdown list control to display a dropdown list when the data items for the dropdown list are not currently available.
Figure 5B:
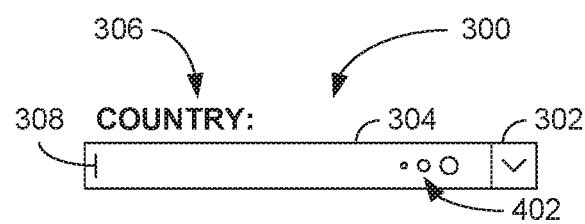
Figure 5C:
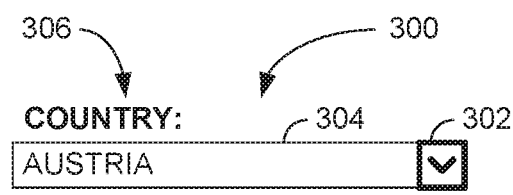

FIGS. 5A, 5B, and 5C are graphical representations of an example embodiment in which multiple user inputs are directed to a dropdown list control 300 to display the dropdown list 310 when the data items 312 for the dropdown list 310 are not currently available. Beginning with FIG. 5A, the user activates (e.g., clicks or touches) the text input field 304 of the dropdown list control 300. As was the case with FIG. 4A, the user interface module 204 may not yet react with a determination of whether the data items 312 of the dropdown list 310 are available. However, as indicated in FIG. 5B, the user then enters some additional input (e.g., a down-arrow key in this example embodiment) to display at least one of the data items 312 while displaying that data item 312 and others in the dropdown list 310. In response, the user interface module 204 may determine that the data items 312 for this dropdown list 310 are not available, queue the associated user input event in the user interface event queue 206, and request information identifying the data items 312 from the server system 102. Thereafter, the user interface module 204 may display the busy indicator 402, this time within the text input field 304 of the dropdown list control 300.

During this time, the user may enter further additional user input, such as an activation of the dropdown button 302. In some example embodiments in which the information identifying the data items 312 are currently available in the client system 120, this activation may cause removal of the dropdown list 310 while allowing the display of the first-listed data item 312 in the text input field 304 to remain. In this example, however, in which the data items 312 are not currently available, the user interface module may queue the further additional user input in the user interface event queue 206.

Once the information identifying the data items 312 becomes available at the client system 120, the events in the user interface event queue 206 may be processed by one or more of the user interface event handlers 208. Based on that processing, the dropdown list control 300 of FIG. 5C may be displayed, in which the first data item (Austria) is loaded into the text input field 304 and the dropdown button 302 is highlighted on the basis of the down-arrow and dropdown button 302 user inputs, as described above. In addition, the user interface module 204 or one of the user interface event handlers 208 may remove the busy indicator 402 from the user interface. At this point, the user may only need to click the dropdown button 302, press the 'Enter' key, or the like to enter the first data item (Austria) as the user selection for the dropdown list control 300.

Figure 6A:
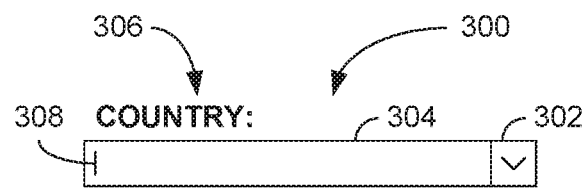
FIGS. 6A, 6B, 6C, and 6D are graphical representations of another example embodiment in which multiple user inputs are directed to a dropdown list control to display a dropdown list when the data items for the dropdown list are not currently available.
Figure 6B:
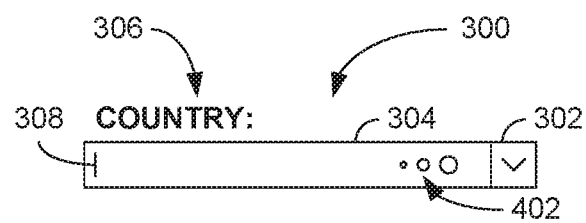
Figure 6C:
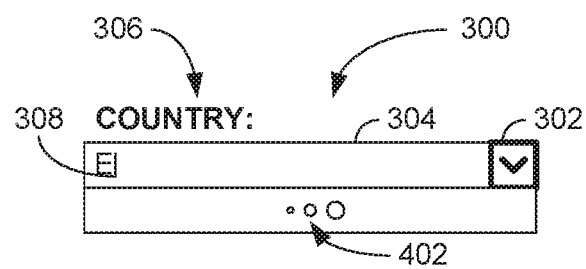

FIGS. 6A, 6B, 6C, and 6D are graphical representations of another example embodiment in which multiple user inputs are directed to a dropdown list control 300 to display a dropdown list 310 when the data items 312 for the dropdown list 310 are not currently available. In this example embodiment, the dropdown list control 300 of FIGS. 6A and 6B illustrates the same states as the dropdown list control 300 of FIGS. 5A and 5B in which the user has activated the text input field 304 (as depicted in the dropdown list control 300 of FIG. 6A) (e.g., by clicking on the text input field 304) and pressing the down-arrow key (or another function key) (as depicted in the dropdown list control 300 of FIG. 6B). During this time, information identifying the data items 312 of the dropdown list 310 is not available at the client system 120, resulting in the display of the busy indicator 402 in the text input field 304.

If, thereafter, the user enters a text character (e.g., 'E') into the text input field 304 while the information identifying the data items 312 is still not available at the client system 120, as shown in the dropdown list control 300 of HG. 6C, the interface module 304 may move the busy indicator 402 from the text input field 304 to a location at which the dropdown list 310 is typically displayed. This change in location may align with the attention of the user being directed to the area in which the user expects the dropdown list 310 to be displayed, as well as create more space within the text input field 304. As before, the user interface module 204 may queue each of these user inputs (e.g., the down-arrow input and the inputting of the text character) in the user interface event queue 206 while awaiting the information regarding the data items 312 from the server system 102.

Figure 6D:
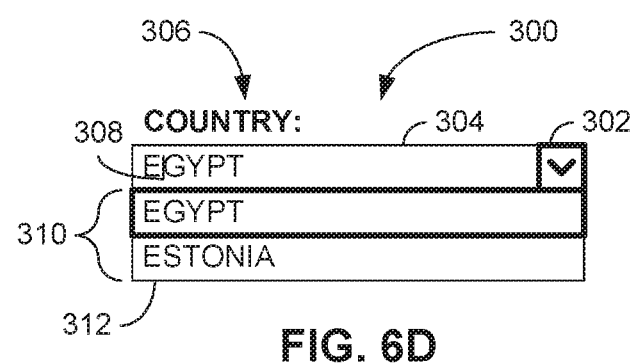

In response to the reception of the information identifying the data items 312, the user interface module 204 may initiate processing of the queued events by one or more user interface event handlers 208, resulting in the dropdown list control 300 of FIG. 6D, in which the data items 312 are filtered using the text input field 304 (e.g., the character 'E'), and with the first matching data item 312 (e.g., 'Egypt') being displayed in the text input field 304. In addition, the user interface module 204 or one of the user interface event handlers 208 may remove the busy indicator 402 from the user interface.

Figure 7A:
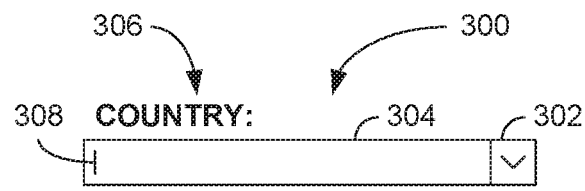
FIGS. 7A, 7B, and 7C are graphical representations of another example embodiment in which multiple user inputs are directed to a dropdown list control to display a dropdown list when the data items for the dropdown list are not currently available.
Figure 7B:
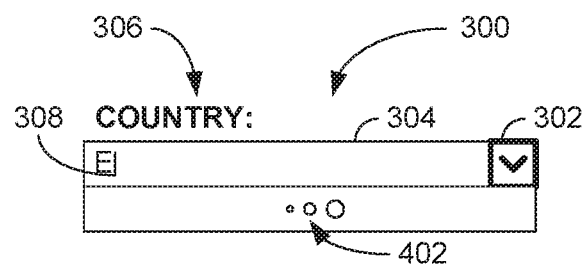
Figure 7C:
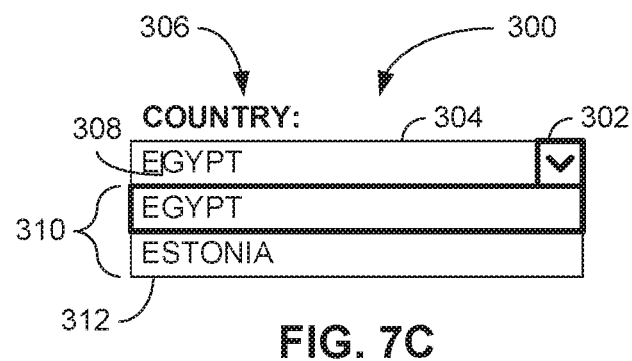

FIGS. 7A, 7B, and 7C are graphical representations of another example embodiment in which multiple user inputs are directed to a dropdown list control 300 to display a dropdown list 310 when the data items 312 for the dropdown list 310 are not currently available. In this example embodiment, while information regarding the data items 312 of the dropdown list 310 is currently unavailable in the client system 120, the user has activated (e.g., clicked or touched) the text input field 304 of the dropdown list control 300 of FIG. 7A, followed by entering a text character (e.g., 'E') in the text input field 304 of the dropdown list control 300 of FIG. 7B and possibly highlighting the dropdown button 302.

As shown in FIG. 7B, the user interface module 204 may process the display aspects of the clicking of the text input field 304 and the entry of the text character therein, but may still queue a user interface event in the user interface event queue 206 at approximately the time the user interface module 204 requests the information identifying the data items 312 from the server system 102. In response to the requested information being received at the client system 120, as shown in the dropdown list control 300 of FIG. 7C, one or more user interface event handlers 208 may then process the events queued in the user interface event queue 206 to cause the display of the dropdown list 310 and the updating of the text input field 304 to reflect the filtering of the data items 312 based on the previous entry of the text character by the user. The one or more user interface event handlers 208 or the user interface module 204 may also remove the busy indicator 402 from the dropdown list control 300.

Consequently, in the example embodiments of FIGS. 4A through 4C, FIGS. 5A through 5C, FIGS. 6A through 6D, and FIGS. 7A through 7C, the user interface module 204 has decoupled the reception of the user input from the presentation of that user input on the display and/or the actual processing of the user input in terms of its effect on the dropdown list 310 of data items 312 for at least some of the user inputs received via the user interface. Consequently, the request and subsequent reception of information identifying the data items 312 may be delayed until an actual need for that information arises.

Figure 8:
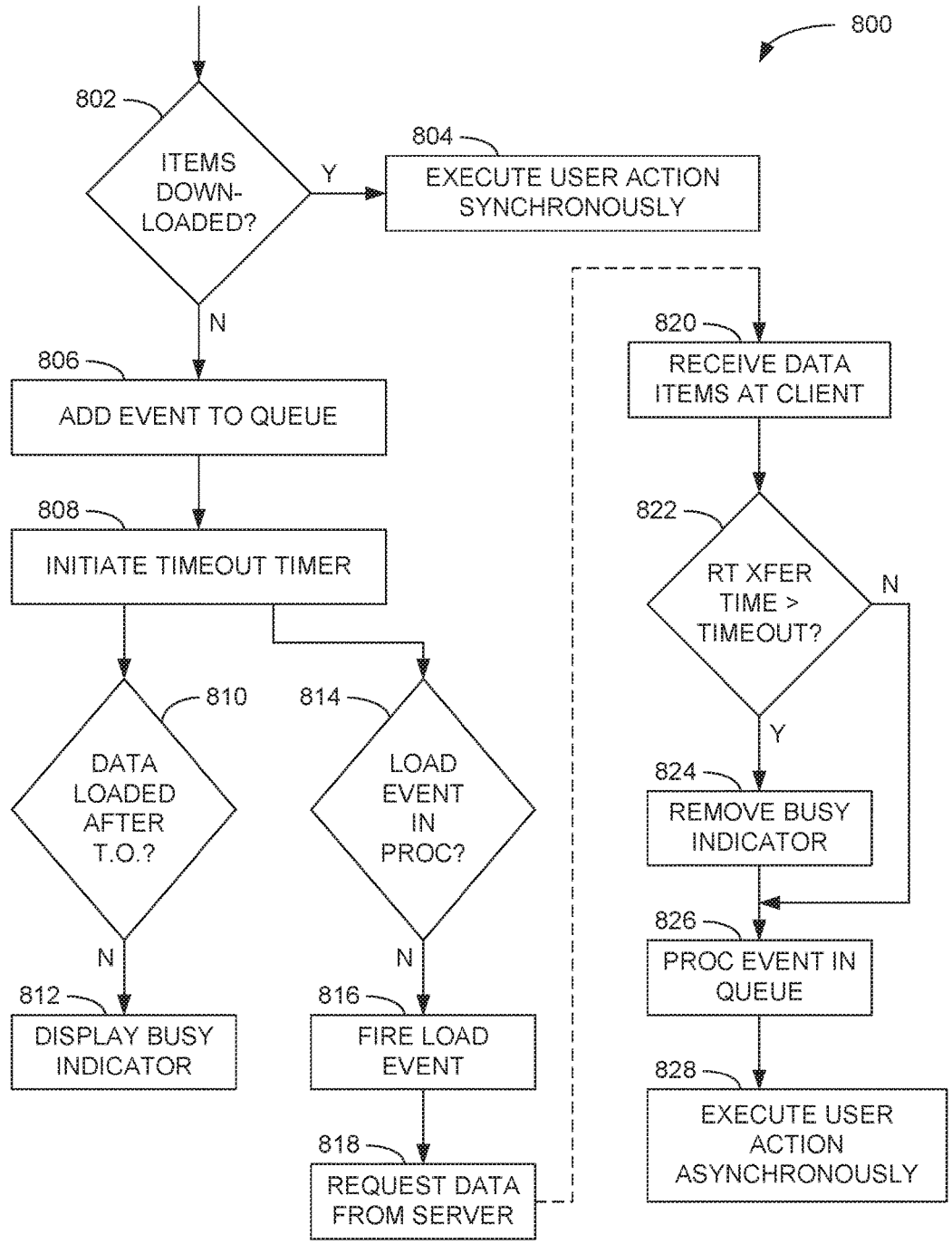
FIG. 8 is a flow diagram of an example method of processing a user input directed to a dropdown list control.

FIG. 8 is a flow diagram of an example method 800 of processing one or more user inputs directed to a dropdown list control 300, examples of which are described above with respect to FIGS. 3A through 7C. In the method 800, after the reception of one or more user inputs directed to the dropdown list control 300, the user interface module 204 may determine whether the data items 312 of the associated dropdown list 310 have already been retrieved or downloaded from the server system 102 (operation 802). If the data items 312 have already been downloaded, such as in response to a previous user interaction with the dropdown list control 300, the user interface module 204 may then execute the user inputs synchronously (operation 804) in conjunction with the reception of the user inputs.

If, instead, the data items 312 of the dropdown list 310 corresponding to the activated dropdown list control 300 are not currently available at the client system (operation 802), the user interface module 204 may add one or more events to the user interface event queue 206 (operation 806) and initiate a timeout timer (operation 808). In some example embodiments, the user interface module 204 may employ the timeout timer to delay presentation of the busy indicator 402 for some period of time while the user interface module 204 attempts to retrieve the information identifying the data items 312 from the server system 102. In one example embodiment, the timeout timer may be set to 300 msec, but other values, either shorter or longer, may be employed in other embodiments.

After the initiation of the timeout timer (operation 808), the user interface module 204 may check (e.g., by way of a timer event associated with expiration of the timeout timer) whether the requested data items 312 have been received or loaded from the server system 102 by the time the timeout timer has expired (operation 810). If the requested data items 312 have not been loaded by that time, the user interface module 204 or an event handler associated with the timeout timer may cause the busy indicator 402 to be displayed (operation 812), Otherwise, if the requested data items 312 have been received or loaded prior to the time the timeout timer expires, display of the busy indicator 402 may not occur.

Also after the initiation of the timeout timer (operation 808), the user interface module 204 may determine whether a request to receive or load the data items 312 of the dropdown list 310 from the server system 102 has already been issued (operation 814). In an example embodiment, the user interface module 204 may perform such a determination to prevent the issuing of a second request for the same data items 312, such as in response to a previous user interface event. If such a request has been issued, the user interface module 204 may allow a user interface event handler 208 to process an event associated with the previously issued request.

In some example embodiments, the user interface module 204 does not use a timeout timer, opting instead to display the busy indicator 402 once the user interface event is added to the user interface event queue (operation 806). Also in those example embodiments, the checking of whether the request for the data items 312 has been issued (operation 814) may occur after the queuing of the one or more user interface events to the user interface event queue 206 (operation 806).

If no such request has been issued (operation 814), the user interface module 204 may then initiate, or "fire", a load event (operation 816) to prepare a user interface event handler 208 to process the data items 312 when then are received. Also, the user interface module 204 may then initiate a request for the data items 312 from the server system 102 (operation 818).

Subsequent to the request, the client system 120 may receive the requested data items 312 (operation 820). In response to the loading of the data items 312, a user interface event handler 208 associated with the request of the data items 312 may then determine whether the roundtrip time (e.g., from the time the data items 312 were requested until the time the data items 312 were received at the client system 120) exceeded the time period employed in the timeout timer (operation 822). If so, the event handler may then remove the busy indicator 402 from the display (operation 824). In either case, the user interface event handler 208 for the data item 312 request may then access the queued user interface events in the user interface event queue 206 and process those events (operation 826), resulting in the associated user inputs being processed asynchronously (operation 828) from the actual reception of the user inputs, as described above.

While the particular operations 802-828 of the method 800 of FIG. 8 are depicted as being performed in a particular order, other orders of operation, including simultaneous or concurrent execution of two or more of the operations 820-828, are also possible in some embodiments.

In the appended program listing below, several objects are provided which perform one or more of the operations 802-828 of the method 800, resulting in the various user interface examples of FIGS. 3A through 7C. However, examples other than those described above are also possible when the appended program listing is employed.

The program listing appendix includes user interface event handlers (or key event handlers) 208 for various user interface inputs, such as a down-arrow key event ("ondown"), a 'Home' key event ("onhome"), an 'End' key event ("onend"), a 'Page Down' key event ("onpagedown"), a 'Page Up' key event ("onpagedown"), a combination 'Alt' key/"Down" key (or a function 'F4' key) event ("onshow"), a text input event ("oninput") (e.g., when a user enters text (via keyboard, drop-and-drag, copy-and-paste, voice command, etc.) into the text input field 304 and opens the dropdown list 310), and a "tap" or "click" event ("ontap") (e.g., when the user clicks the dropdown list button 302 to open the dropdown list 310). In addition, some sample code that may be employed in an application executing in the client system 120 that utilizes the dropdown list 310, and a method ("loadItems") for processing user input events either synchronously or asynchronously using the data items 312 of the dropdown list 310 are provided in the appendix.

In the various key event handlers 208, some preventative measures, such as preventing changes to the dropdown list control 300 when the control is disabled or non-editable, or preventing document scrolling, may be taken. Each of the key event handlers 208 may also provide a function reference that is passed to the loadItems method, which loads to the user interface event queue 206 that is ultimately retrieved and executed when the data items 312 of the dropdown list 310 are received from the server system 102. Those functions may perform the various operations described above in conjunction with their corresponding user inputs (e.g., key presses, mouse clicks, touchscreen touches, and so on).

As shown in the appendix, the loadItems method may cause each user interface input it receives to be processed synchronously (operation 804 of FIG. 8) if the data items 312 are present (operation 802). Otherwise, loadItems enqueues the input in the user interface event queue 206 (operation 806), initiates the timeout timer for the busy indictor (operation 808), determines whether the loading of the data items 312 from the server system 102 is already in progress (operation 814), and initiates the loading event if not (operation 816).

The sample application code provided in the appendix supplies the code needed to load the particular items associated with the dropdown list control 300 provided by that application. When the data items 312 are received at the client system 120, a handler named "onItemsLoaded" is executed, which removes the busy indicator if it has been displayed (operations 822 and 824). This handler also processes the user interface inputs enqueued in the user interface event queue 206 in the loadItems method by way of calls to the various user interface handlers 208 identified therewith.

In an example embodiment, a system includes one or more hardware processors and a memory storing instructions that, when executed by at least one of the one or more hardware processors, cause the system to perform operations comprising causing presentation of a user interface on a visual display, the user interface comprising a dropdown list control for a dropdown list, the dropdown list comprising one or more data items; receiving, via the user interface, a user input directed to the dropdown list control to cause presentation of at least one of the one or more data items of the dropdown list; and determining, in response to the user input, whether the one or more data items are available for presentation. The operations further comprise based on a determination that the one or more data items are not available for presentation: queuing the user input in an event queue; requesting the one or more data items from a separate computing system via a communication network; causing, on the user interface, presentation of a busy indicator in conjunction with the dropdown list control, the busy indicator indicating that the one or more data items are not available for presentation; receiving the one or more data items from the separate computing system; and in response to the receiving of the one or more data items: causing removal of the busy indicator from the user interface; and processing the user input queued in the event queue.

In another example embodiment, including all previous example embodiments, the operations further comprise processing, based on a determination that the one or more data items are available for presentation, the user input.

In another example embodiment, including all previous example embodiments, the user input comprises a first user input, the operations further comprising receiving, via the user interface prior to the receiving of the one or more data items, a second user input directed to the dropdown list control; queuing the second user input in the event queue; and processing, after the processing of the first user input, the second user input.

In another example embodiment, including all previous example embodiments, the operations further comprise initiating, based on the determination that the one or more data items are not available for presentation, a timeout timer; wherein the causing of the presentation of the busy indicator is further based on an expiration of the timeout timer.

In another example embodiment, including all previous example embodiments, the dropdown list control comprises a dropdown button configured to cause presentation of at least one of the one or more data items on the user interface, the user input comprising a user selection of the dropdown button.

In another example embodiment, including all previous example embodiments, the presentation of the busy indicator occurs at an area of the user interface for presentation of at least one of the one or more data items.

In another example embodiment, including all previous example embodiments, the dropdown list control comprises a text input field configured to receive text input for selection of at least one of the one or more data items, the user input comprising a user selection of the text input field followed by a multiple key input.

In another example embodiment, including all previous example embodiments, the multiple key input comprises a direction function key and an alternate function key.

In another example embodiment, including all previous example embodiments, the presentation of the busy indicator occurs at an area of the user interface for presentation of at least one of the one or more data items.

In another example embodiment, including all previous example embodiments, the dropdown list control comprises a text input field configured to receive text input for selection of at least one of the one or more data items, the user input comprising a user selection of the text input field followed by a single key input.

In another example embodiment, including all previous example embodiments, the single key input comprises a direction function key.

In another example embodiment, including all previous example embodiments, the presentation of the busy indicator occurs at the text input field.

In another example embodiment, including all previous example embodiments, the user input comprises a first user input, and the operations further comprise receiving, via the user interface after the receiving of the first user input, a second user input comprising entry of at least one text character in the text input field; and relocating, in response to the receiving of the second user input, the presentation of the busy indicator from the text input field.

In another example embodiment, including all previous example embodiments, the relocating of the presentation of the busy indicator comprises causing presentation of the busy indicator at an area of the user interface for presentation of at least one of the one or more data items.

In another example embodiment, including all previous example embodiments, the dropdown list control comprises a text input field configured to receive text input for selection of at least one of the one or more data items, the user input comprising a user selection of the text input field followed by entry of at least one text character in the text input field.

In another example embodiment, including all previous example embodiments, the presentation of the busy indicator occurs at an area of the user interface for presentation of at least one of the one or more data items.

In another example embodiment, including all previous example embodiments, the operations further comprise causing, based on the determination that the one or more data items are not available for presentation, presentation of an effect of the user input via the user interface.

In another example embodiment, including all previous example embodiments, the dropdown list control comprises a dropdown button configured to cause presentation of at least one of the one or more data items on the user interface, the user input comprising a user selection of the dropdown button, and the causing of the presentation of the effect of the user input comprising altering a visual appearance of the dropdown button.

In an example embodiment, a method comprises causing presentation of a user interface on a visual display, the user interface comprising a dropdown list control for a dropdown list, the dropdown list comprising one or more data items for user selection; receiving, via the user interface, a user input directed to the dropdown list control to cause presentation of at least one of the one or more data items of the dropdown list; and determining, in response to the user input, using a hardware processor, whether the one or more data items are available for presentation. The method further comprises based on a determination that the one or more data items are not available for presentation: queuing the user input in an event queue; requesting the one or more data items from a separate computing system via a communication network; causing, on the user interface, presentation of a busy indicator in conjunction with the dropdown list control, the busy indicator indicating that the one or more data items are not available for presentation; receiving the one or more data items from the separate computing system; and in response to the receiving of the one or more data items: causing removal of the busy indicator from the user interface; and processing the user input queued in the event queue.

In an example embodiment, a non-transitory computer-readable storage medium stores instructions that, when executed by one or more processors of a machine, cause the machine to perform operations comprising causing presentation of a user interface on a visual display, the user interface comprising a dropdown list control for a dropdown list, the dropdown list comprising one or more data items for user selection; receiving, via the user interface, a user input directed to the dropdown list control to cause presentation of at least one of the one or more data items of the dropdown list; and determining, in response to the user input, whether the one or more data items are available for presentation. The operations further comprise based on a determination that the one or more data items are not available for presentation: queuing the user input in an event queue; requesting the one or more data items from a separate computing system via a communication network; causing, on the user interface, presentation of a busy indicator in conjunction with the dropdown list control, the busy indicator indicating that the one or more data items are not available for presentation; receiving the one or more data items from the separate computing system; and in response to the receiving of the one or more data items: causing removal of the busy indicator from the user interface; and processing the user input queued in the event queue.

Figure 9:
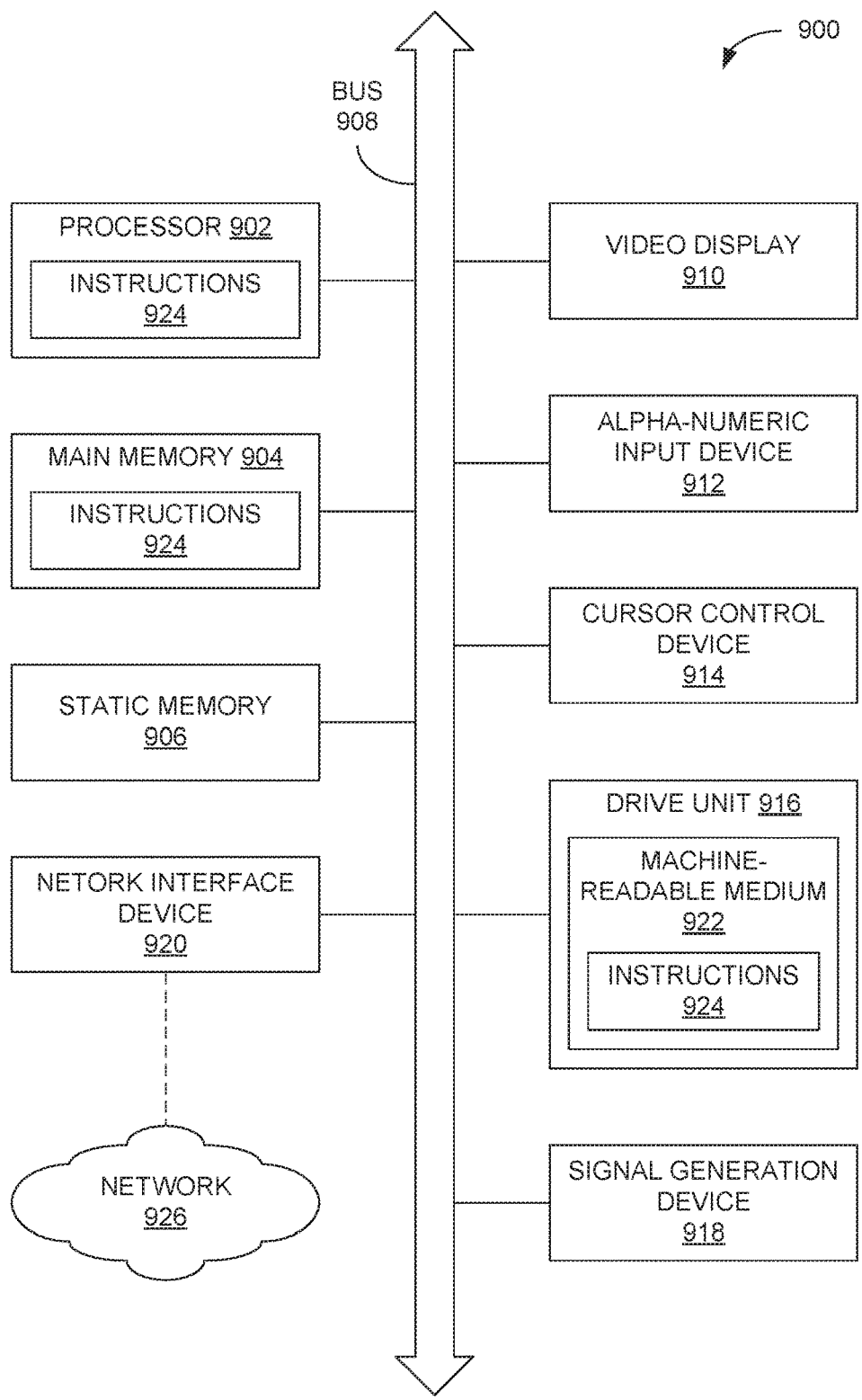
FIG. 9 is a block diagram of a computer processing system within which a set of instructions may be executed for causing a computer to perform any one or more of the methodologies discussed herein.

FIG. 9 is a block diagram of a computer processing system 900 within which a set of instructions 924 may be executed for causing a computer to perform any one or more of the methodologies discussed herein, such as those discussed in conjunction with FIGS. 3A-8, as well as other methodologies discussed herein. In some embodiments, the computer operates as a standalone device or may be connected (e.g., networked) to other computers. In a networked deployment, the computer may operate in the capacity of a server or a client computer in a server-client network environment, or as a peer computer in a peer-to-peer (or distributed) network environment. Moreover, the computer processing system 900 may serve in example embodiments as, for example, the client system 120 of FIGS. 1 and 2, as well as any component or module 202-208 described therewith.

In addition to being sold or licensed via traditional channels, embodiments may also be deployed, for example, by software-as-a-service (SaaS) providers, application service providers (ASPs), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 900 includes a processor 902 (e.g., a central processing unit (CPU), a graphics processing unit (GPU), or both), a main memory 904, and a static memory 906, which communicate with each other via a bus 908. The computer processing system 900 may further include a video display 910 (e.g., a plasma display, a liquid crystal display (LCD), or a cathode ray tube (CRT)). The computer processing system 900 also includes an alphanumeric input device 912 (e.g., a keyboard), a user interface (UI) cursor control device 914 (e.g., a mouse and/or touch screen), a drive unit 916, a signal generation device 918 (e.g., a speaker), and a network interface device 920.

The drive unit 916 includes a machine-readable medium 922 on which is stored one or more sets of instructions 924 and data structures embodying or utilized by any one or more of the methodologies or functions described herein. The instructions 924 may also reside, completely or at least partially, within the main memory 904, the static memory 906, and/or the processor 902 during execution thereof by the computer processing system 900, with the main memory 904, the static memory 906, and the processor 902 also constituting tangible machine-readable media 922.

The instructions 924 may further be transmitted or received over a network 926 via the network interface device 920 utilizing any one of a number of well-known transfer protocols (e.g., Hypertext Transfer Protocol).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions 924. The term "machine-readable medium" shall also be taken to include any medium that is capable of storing, encoding, or carrying a set of instructions 924 for execution by the computer and that cause the computer to perform any one or more of the methodologies of the present application, or that is capable of storing, encoding, or carrying data structures utilized by or associated with such a set of instructions 924. The term "machine-readable medium" shall accordingly be taken to include, but not be limited to, solid-state memories, optical and magnetic media, and other non-transitory media.

While the example embodiments discussed herein are described with reference to various implementations and exploitations, these example embodiments are illustrative, and the scope of the disclosure is not so limited. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations, Other allocations of functionality are possible and may fall within a scope of various embodiments of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements fall within a scope of embodiments of the present disclosure as represented by the appended claims.

PROGRAM LISTING APPENDIX

```
/**
 * Handles the <code>down</code> pseudo event when the Down arrow key is pressed.
 *
 * @param {jQuery.Event} oEvent The event object.
 */
ComboBox.prototype.ondown = function(oEvent) {
    var oControl = oEvent.srcControl;

// in case of a non-editable or disabled combo box, the selection cannot be
    // modified
    if (!oControl.getEnabled() || !oControl.getEditable()) {
        return;
    }

// mark the event for components that need to know if the event was handled
    oEvent.setMarked();

// note: prevent document scrolling when arrow keys are pressed
    oEvent.preventDefault();

this.loadItems(function navigateToNextSelectableItem() {
        var aSelectableItems = this.getSelectableItems();
        var oNextSelectableItem = aSelectableItems
            [aSelectableItems.indexOf(this.getSelectedItem()) + 1];
        fnHandleKeyboardNavigation.call(this, oControl,
            oNextSelectableItem);
    });
};

/**
 * Handles the <code>home</code> pseudo event when the Home key is pressed.
 *
 * The first selectable item is selected and the input field is updated accordingly.
 *
 * @param {jQuery.Event} oEvent The event object.
 */
ComboBox.prototype.onhome = function(oEvent) {
    var oControl = oEvent.srcControl;
    // in case of a non-editable or disabled combo box, the selection cannot be
    // modified
    if (!oControl.getEnabled() || !oControl.getEditable()) {
        return;
```

```
    }

// mark the event for components that needs to know if the event was handled
    oEvent.setMarked();

// note: prevent document scrolling when Home key is pressed
    oEvent.preventDefault();

this.loadItems(function navigateToFirstSelectableItem() {
        var oFirstSelectableItem = this.getSelectableItems()[0];
        fnHandleKeyboardNavigation.call(this, oControl, oFirstSelectableItem);
    });
};

/**
 * Handles the <code>end</code> pseudo event when the End key is pressed.
 *
 * The last selectable item is selected and the input field is updated accordingly.
 *
 * @param {jQuery.Event} oEvent The event object.
 */
ComboBox.prototype.onend = function(oEvent) {
    var oControl = oEvent.srcControl;
    // in case of a non-editable or disabled combo box, the selection cannot be
    // modified
    if (!oControl.getEnabled() || !oControl.getEditable()) {
        return;
    }

// mark the event for components that needs to know if the event was handled
    oEvent.setMarked();

// note: prevent document scrolling when End key is pressed
    oEvent.preventDefault();

this.loadItems(function navigateToLastSelectableItem() {
        var oLastSelectableItem = this.findLastEnabledItem(this.getSelectableItems());
        fnHandleKeyboardNavigation.call(this, oControl, oLastSelectableItem);
    });
};

/**
 * Handles the <code>pagedown</code> pseudo event when the Page Down key is pressed.
```

```
 *
 * @param {jQuery.Event} oEvent The event object.
 */
ComboBox.prototype.onpagedown = function(oEvent) {
    var oControl = oEvent.srcControl;

// in case of a non-editable or disabled combo box, the selection cannot be
    // modified
    if (!oControl.getEnabled() || !oControl.getEditable()) {
        return;
    }

// mark the event for components that needs to know if the event was handled
    oEvent.setMarked();

// note: prevent document scrolling when page down key is pressed
    oEvent.preventDefault();

this.loadItems(function() {
        var aSelectableItems = this.getSelectableItems(),
            iIndex = aSelectableItems.indexOf(this.getSelectedItem()) + 10,
            oItem;

// constrain the index
        iIndex = (iIndex > aSelectableItems.length - 1) ? aSelectableItems.length - 1
            : Math.max(0, iIndex);
        oItem = aSelectableItems[iIndex];
        fnHandleKeyboardNavigation.call(this, oControl, oItem);
    });
};

/**
 * Handles the <code>pageup</code> pseudo event when the Page Up key is pressed.
 *
 * @param {jQuery.Event} oEvent The event object.
 */
ComboBox.prototype.onpageup = function(oEvent) {
    var oControl = oEvent.srcControl;

// in case of a non-editable or disabled combo box, the selection cannot be
    // modified
    if (!oControl.getEnabled() || !oControl.getEditable()) {
        return;
    }
```

```javascript
    // mark the event for components that needs to know if the event was handled
    oEvent.setMarked();

// note: prevent document scrolling when page up key is pressed
    oEvent.preventDefault();

this.loadItems(function() {
        var aSelectableItems = this.getSelectableItems(),
            iIndex = aSelectableItems.indexOf(this.getSelectedItem()) - 10,
            oItem;

// constrain the index
        iIndex = (iIndex > aSelectableItems.length - 1) ? aSelectableItems.length - 1
            : Math.max(0, iIndex);
        oItem = aSelectableItems[iIndex];
        fnHandleKeyboardNavigation.call(this, oControl, oItem);
    });
};

/**
 * Handles the <code>onshow</code> event when either F4 is pressed or Alt + Down
 * arrow are pressed.
 *
 * @param {jQuery.Event} oEvent The event object.
 */
ComboBoxBase.prototype.onshow = function(oEvent) {

// in case of a non-editable or disabled combo box, the picker popup cannot be
    // opened
    if (!this.getEnabled() || !this.getEditable()) {
        return;
    }

// mark the event for components that needs to know if the event was handled
    oEvent.setMarked();

// prevent browser address bar to be open in IE, when F4 is pressed
    if (oEvent.keyCode === jQuery.KeyCodes.F4) {
        oEvent.preventDefault();
    } if (this.isOpen()) {
        this.close();
```

```
        return;
    } this.selectText(0, this.getValue().length); // select all text
    this.loadItems();
    this.bOpenedByKeyboardOrButton = true;
    this.open();
};

/**
 * Handles the <code>oninput</code> event on the input field.
 *
 * @param {jQuery.Event} oEvent The event object.
 */
ComboBox.prototype.oninput = function(oEvent) {
    ComboBoxBase.prototype.oninput.apply(this, arguments);

// @see m.InputBase#oninput
    if (oEvent.isMarked("invalid")) {
        return;
    } var bToggleOpenState = (this.getPickerType() === "Dropdown");

this.loadItems(function() {
        var oSelectedItem = this.getSelectedItem(),
            sValue = oEvent.target.value,
            bEmptyValue = sValue === "",
            oControl = oEvent.srcControl,
            aVisibleItems;

if (bEmptyValue && !this.bOpenedByKeyboardOrButton) {
            aVisibleItems = this.getItems();
        } else {
            aVisibleItems = this.filterItems({
                property: "text",
                value: sValue
            });
        } var bItemsVisible = !!aVisibleItems.length;
        var oFirstVisibleItem = aVisibleItems[0]; // first item that matches the value if (!bEmptyValue && oFirstVisibleItem && oFirstVisibleItem.getEnabled()) {
```

```
    if (oControl._bDoTypeAhead) {
        oControl.updateDomValue(oFirstVisibleItem.getText());
    } this.setSelection(oFirstVisibleItem);

if (oSelectedItem !== this.getSelectedItem()) {
        this.fireSelectionChange({
            selectedItem: this.getSelectedItem()
        });
    } if (oControl._bDoTypeAhead) {

// timeout required for an Android and Windows Phone
        setTimeout(fnSelectTextIfFocused.bind(oControl, sValue.length,
                oControl.getValue().length), 0);
    }
} if (bEmptyValue || !bItemsVisible) {
    this.setSelection(null);

if (oSelectedItem !== this.getSelectedItem()) {
        this.fireSelectionChange({
            selectedItem: this.getSelectedItem()
        });
    }
} if (bItemsVisible) {
    if (bEmptyValue && !this.bOpenedByKeyboardOrButton) {
        this.close();
    } else if (bToggleOpenState) {
        this.open();
        this.scrollToItem(this.getSelectedItem());
    }
} else if (this.isOpen()) {
    if (bToggleOpenState && !this.bOpenedByKeyboardOrButton) {
        this.close();
    }
} else {
    this.clearFilter();
}
```

```
    }, {
        name: "input",
        busyIndicator: false
    }];

// if the loadItems event is being processed,
    // we need to open the dropdown list to show the busy indicator
    if (this.bProcessingLoadItemsEvent && bToggleOpenState) {
        this.open();
    }
};

/**
 * Handles the <code>ontap</code> event on the control.
 *
 * @param {jQuery.Event} oEvent The event object.
 */
ComboBoxBase.prototype.ontap = function(oEvent) {
    ComboBoxTextField.prototype.ontap.apply(this, arguments);

var CSS_CLASS = this.getRenderer().CSS_CLASS_COMBOBOXBASE,
        oControl = oEvent.srcControl;

// in case of a non-editable or disabled combo box,
    // the picker popup cannot be opened
    if (!this.getEnabled() || !this.getEditable()) {
        return;
    }

// mark the event for components that needs to know if the event was handled
    oEvent.setMarked();

if (oControl.isOpenArea(oEvent.target)) { if (this.isOpen()) {
            this.close();
            this.removeStyleClass(CSS_CLASS + "Pressed");
            return;
        } this.loadItems();
        this.bOpenedByKeyboardOrButton = true;
        this.open();
    }
```

```
    if (this.isOpen()) {

// add the active state to the text field
        this.addStyleClass(CSS_CLASS + "Pressed");
    }
};

/**
 * Handles the <code>onshow</code> event when either F4 is pressed or Alt + Down
 * arrow are pressed.
 *
 * @param {jQuery.Event} oEvent The event object.
 */
ComboBoxBase.prototype.onshow = function(oEvent) {

// in case of a non-editable or disabled combo box, the picker popup cannot be
    // opened
    if (!this.getEnabled() || !this.getEditable()) {
        return;
    }

// mark the event for components that needs to know if the event was handled
    oEvent.setMarked();

if (oEvent.keyCode === jQuery.KeyCodes.F4) {
        this.onF4(oEvent);
    } if (this.isOpen()) {
        this.close();
        return;
    } this.selectText(0, this.getValue().length);
    this.loadItems();
    this.bOpenedByKeyboardOrButton = true;
    this.open();
};

/**
 * Handles when the F4 key is pressed.
 *
```

```
 * @param {jQuery.Event} oEvent The event object.
 * @since 1.46
 */
ComboBoxBase.prototype.onF4 = function(oEvent) {

// prevent browser address bar to be open in IE, when F4 is pressed
    oEvent.preventDefault();
};

/**
 * Fires the {@link #loadItems} event if the data used to display items in the
 * dropdown list is not already loaded and enqueue the <code>fnCallBack</code> and
 * <code>mOptions</code> into a message queue for processing.
 *
 * @param {function} [fnCallBack] A callback function to execute after the items are
 * loaded.
 * @param {object} [mOptions] Additional options.
 * @param {string} [mOptions.name] Identifier of the message.
 * @param {boolean} [mOptions.busyIndicator=true] Indicate whether the loading
 * indicator is shown in the text field after some delay.
 * @param {int} [mOptions.busyIndicatorDelay=300] Indicates the delay in
 * milliseconds after which the busy indicator is shown.
 * @since 1.32.4
 */
ComboBoxBase.prototype.loadItems = function(fnCallBack, mOptions) {
    var bCallBackIsAFunction = typeof fnCallBack === "function";

// items are not loaded
    if (this.hasLoadItemsEventListeners() && (this.getItems().length === 0)) {
        this._bOnItemsLoadedScheduled = false;

if (bCallBackIsAFunction) { mOptions = jQuery.extend({
                action: fnCallBack,
                busyIndicator: true,
                busyIndicatorDelay: 300
            }, mOptions);

this.aMessageQueue.push(mOptions);

// sets up a timeout to know if the data used to display the items in the
            // dropdown list is loaded after a 300ms delay, to show the busy indicator
            // in the text field, notice that if the items are loaded before 300ms the
```

```
            // timeout is canceled
            if ((this.iLoadItemsEventInitialProcessingTimeoutID === -1) &&

// the busy indicator in the input field should not be shown while the
                // user is typing
                (mOptions.busyIndicator)) { this.iLoadItemsEventInitialProcessingTimeoutID = setTimeout(function
                    onItemsNotLoadedAfterDelay() {
                        this.setInternalBusyIndicatorDelay(0);
                        this.setInternalBusyIndicator(true);
                }.bind(this), mOptions.busyIndicatorDelay);
            }
        }

// process the loadItems event only once
        if (!this.bProcessingLoadItemsEvent) {
            this.bProcessingLoadItemsEvent = true;

// application code must provide the items in the loadItems event listener
            this.fireLoadItems();
        }

// items are already loaded
    } else if (bCallBackIsAFunction) {

// synchronous callback
        fnCallBack.call(this);
    }
};

/**
 * Sample application code
 */
<!DOCTYPE html>
<html>
<head>
    <meta http-equiv="X-UA-Compatible" content="IE=edge" />
    <meta charset="UTF-8">
    <meta name="viewport" content="width=device-width, initial-scale=1.0,
        maximum-scale=1.0, user-scalable=no">
    <title>m.ComboBox loadItems event sample (openuinightly.ondemand.com) </title>
    <script id="ui-bootstrap"
            src="https://openuinightly.ondemand.com/resources/ui-core.js"
            data-ui-libs="ui.m"
```

```
            data ui bindingSyntax="complex"
            data ui theme="bluecrystal"></script>
    <script>
        var sServiceUrl =
            "/databinding/proxy/http/services.odata.org/V2/Northwind/Northwind.svc/";
        var oModel = new ui.model.odata.v2.ODataModel({
            serviceUrl: sServiceUrl
        });

var oItemTemplate = new ui.core.Item({
            text: "{ProductName}"
        });

var oComboBox = new m.ComboBox({
            width: "22rem",
            items: {
                path: "/Invoices",
                template: oItemTemplate,
                suspended: true
            },
            loadItems: function(oControlEvent) {
                jQuery.log.info('Event fired: "loadItems" on', this);
                oControlEvent.getSource().getBinding("items").resume(); // trigger the
                                                                        // loading of the data
            }
        });
        oComboBox.setModel(oModel);
        oComboBox.placeAt("content");
    </script>
</head>
<body class="UiBody UiSizeCompact">
<div id="content"></div>
</body>
</html>

/**
 * Event handler for when items have been loaded
 */
ComboBoxBase.prototype.onItemsLoaded = function() {

// restore the busy indicator state to its previous state (if it has not been
    // changed)
    // note: this is needed to avoid overriding application settings
    if (this.bInitialBusyIndicatorState !== this.getBusy()) {
```

```
        this.setInternalBusyIndicator(this.bInitialBusyIndicatorState);
    }

// restore the busy indicator delay to its previous state (if it has not been
    // changed)
    // note: this is needed to avoid overriding application settings
    if (this.iInitialBusyIndicatorDelay !== this.getBusyIndicatorDelay()) {
        this.setInternalBusyIndicatorDelay(this.iInitialBusyIndicatorDelay);
    }

// process the message queue
    for (var i = 0, mCurrentMessage, mNextMessage, bIsCurrentMessageTheLast;
         i < this.aMessageQueue.length; i++) {
        mCurrentMessage = this.aMessageQueue.shift(); // get and delete the first
                                                      // event from the queue
        i--;
        bIsCurrentMessageTheLast = (i + 1) === this.aMessageQueue.length;
        mNextMessage = bIsCurrentMessageTheLast ? null : this.aMessageQueue[i + 1];

if (typeof mCurrentMessage.action === "function") {
            if ((mCurrentMessage.name === "input") &&
                !bIsCurrentMessageTheLast &&
                (mNextMessage.name === "input")) {

// no need to process this input event because the next is pending
                continue;
            } mCurrentMessage.action.call(this);
        }
    }
};
```

What is claimed is:

1. A system comprising:
   one or more hardware processors; and
   a memory storing instructions that, when executed by at least one of the one or more hardware processors, cause the system to perform operations comprising:
   causing presentation of a user interface on a visual display, the user interface comprising a dropdown list control for a dropdown list, the dropdown list comprising one or more data items for user selection;
   receiving, via the user interface, a user input directed to the dropdown list control to cause presentation of at leak one of the one or more data items of the dropdown list;
   determining, in response to the user input, whether the one or more data items are available for presentation;
   based on a determination that the one or more data items are not available for presentation:
   queuing the user input in an event queue;
   requesting the one or more data items from a separate computing system via a communication network;
   causing, on the user interface, presentation of a busy indicator in conjunction with the dropdown list control, the busy indicator indicating that the one or more data items are not available for presentation;
   receiving the one or more data items from the separate computing system;
   in response to the receiving of the one or more data items, causing removal of the busy indicator from the user interface and processing the user input queued in the event queue;
   receiving, via the user interface after the receiving of the first user input, a second user input comprising entry of at least one text character in the text input field; and
   relocating, in response to the receiving of the second user input, the presentation of the busy indicator from the text input field.

2. The system of claim 1, the operations further comprising:
   processing, based on a determination that the one or more data items are available for presentation, the user input.

3. The system of claim 1, the user input comprising a first user input, the operations further comprising:
   receiving, via the user interface prior to the receiving of the one or more data items, a second user input directed to the dropdown list control;
   queuing the second user input in the event queue; and
   processing, after the processing of the first user input, the second user input.

4. The system of claim 1, the operations further comprising:
   initiating, based on the determination that the one or more data items are not available for presentation, a timeout timer;
   wherein the causing of the presentation of the busy indicator is further based on an expiration of the timeout timer.

5. The system of claim 1, the dropdown list control comprising a dropdown button configured to cause presentation of at least one of the one or more data items on the user interface, the user input comprising a user selection of the dropdown button.

6. The system of claim 5, the presentation of the busy indicator occurring at an area of the user interface for presentation of at least one of the one or more data items.

7. The system of claim 1, the dropdown list control comprising a text input field configured to receive text input for selection of at least one of the one or more data items, the user input comprising a user selection of the text input field followed by a multiple key input.

8. The system of claim 7, the multiple key input comprising a direction function key, and an alternate function key.

9. The system of claim 7, the presentation of the busy indicator occurring at an area of the user interface for presentation of at least one of the one or more data items.

10. The system of claim 1, the dropdown list control comprising a text input field configured to receive text input for selection of at least one of the one or more data items, the user input comprising a user selection of the text input field followed by a single key input.

11. The system of claim 10, the single key input comprising a direction function key.

12. The system of claim 10, the presentation of the busy indicator occurring at the text input field.

13. The system of claim 1, the relocating of the presentation of the busy indicator comprising causing presentation of the busy indicator at an area of the user interface for presentation of at least one of the one or more data items.

14. The system of claim 1, the dropdown list control comprising a text input field configured to receive text input for selection of at least one of the one or more data items, the user input comprising a user selection of the text input field followed by entry of at least one text character in the text input field.

15. The system of claim 14, the presentation of the busy indicator occurring at an area of the user interface for presentation of at least one of the one or more data items.

16. The system of claim 1, the operations further comprising:
    causing, based on the determination that the one or more data items are not available for presentation, presentation of an effect of the user input via the user interface.

17. The system of claim 16, the dropdown list control comprising a dropdown button configured to cause presentation of at least one of the one or more data items on the user interface, the user input comprising a user selection of the dropdown button, and the causing of the presentation of the effect of the user input comprising altering a visual appearance of the dropdown button.

18. A method comprising:
    causing presentation of a user interface on a visual display, the user interface comprising a dropdown list control for a dropdown list, the dropdown list comprising one or more data items for user selection;
    receiving, via the user interface, a user input directed to the dropdown list control to cause presentation of at least one of the one or more data items of the dropdown list;
    determining, in response to the user input, using a hardware processor, whether the one or more data items are available for presentation;
    based on a determination that the one or more data items are not available for presentation:
    queuing the user input in an event queue;
    requesting the one or more data items from a separate computing system via a communication network;
    causing, on the user interface, presentation of a busy indicator in conjunction with the dropdown list control, the busy indicator indicating that the one or more data items are not available for presentation;
    receiving the one or more data items from the separate computing system;

in response to the receiving of the one or more data items, causing removal of the busy indicator from the user interface and processing the user input queued in the event queue;

receiving, via the user interface after the receiving of the first user input, a second user input comprising entry of at least one text character in the text input field; and relocating, in response to the receiving of the second user input, the presentation of the busy indicator from the text input field.

19. A non-transitory computer-readable storage medium storing instructions that, when executed by one or more processors of a machine, cause the machine to perform operations comprising:

causing presentation of a user interface on a visual display, the user interface comprising a dropdown list control for a dropdown list, the dropdown list comprising one or more data items for user selection;

receiving, via the user interface, a user input directed to the dropdown list control to cause presentation of at least one of the one or more data items of the dropdown list;

determining, in response to the user input, whether the one or more data items are available for presentation;

based on a determination that the one or more data items are not available for presentation:

queuing the user input in an event queue;

requesting the one or more data items from a separate computing system via a communication network;

causing, on the user interface, presentation of a busy indicator in conjunction with the dropdown list control, the busy indicator indicating that the one or more data items are not available for presentation;

receiving the one or more data items from the separate computing system;

in response to the receiving of the one or more data items, causing removal of the busy indicator from the user interface and processing the user input queued in the event queue;

receiving, via the user interface after the receiving of the first user input, a second user input comprising entry of at least one text character in the text input field; and relocating, in response to the receiving of the second user input, the presentation of the busy indicator from the text input field.

* * * * *